M. G. MORSE.
SLEIGH ATTACHMENT FOR AUTOS.
APPLICATION FILED MAY 17, 1919.

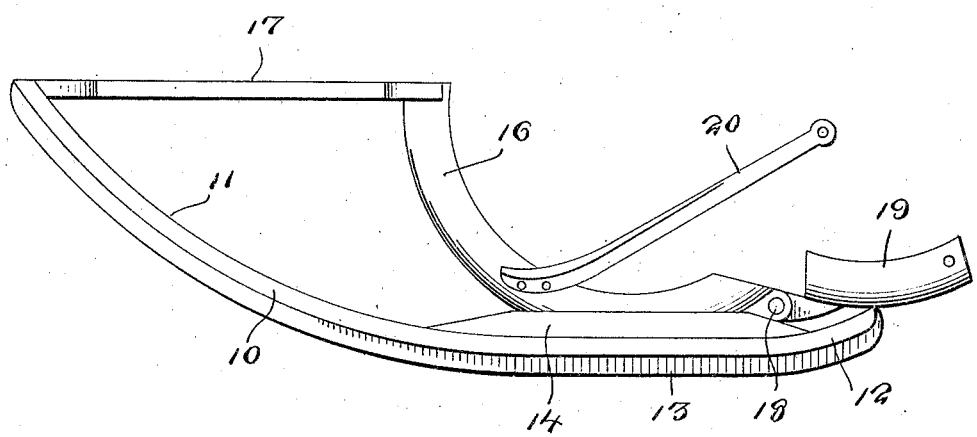
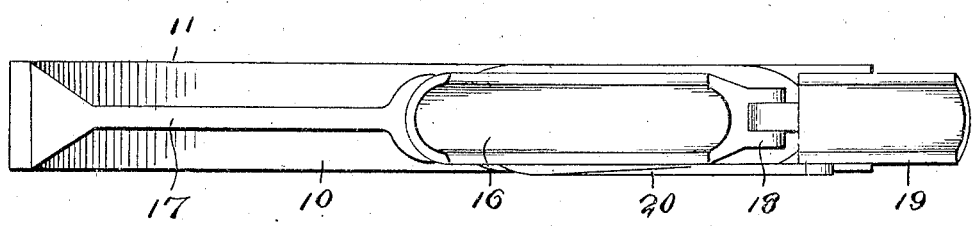
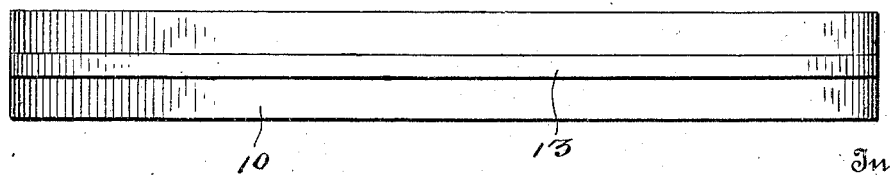

1,363,148.

Patented Dec. 21, 1920.
2 SHEETS—SHEET 2.

Witnesses
E. R. Ruppert

Inventor
M. G. Morse
By Victor J. Evans
Attorney

UNITED STATES PATENT OFFICE.

MELVIN G. MORSE, OF CLIO, MICHIGAN, ASSIGNOR OF FIFTY-FIVE PER CENT. TO FRANK WRETLOF, OF FLINT, MICHIGAN.

SLEIGH ATTACHMENT FOR AUTOS.

1,363,148.  Specification of Letters Patent.  Patented Dec. 21, 1920.

Application filed May 17, 1919. Serial No. 297,756.

*To all whom it may concern:*

Be it known that I, MELVIN G. MORSE, a citizen of the United States, residing at Clio, in the county of Genesee and State of Michigan, have invented new and useful Improvements in Sleigh Attachments for Autos, of which the following is a specification.

This invention relates to motor vehicles, particularly to attachments therefor, and has for its object the provision of sleigh or runner attachments which may be engaged upon the front wheels so that the automobile may be more readily used even in deep snow and without danger of side slipping.

An important object is the provision of an attachment of this character which does not necessitate the removal from the front wheels of the tires and which is so constructed that the automobile may be driven onto the attachment and prevented from subsequent displacement therefrom by certain peculiar locking means.

An additional object is the provision of a sleigh attachment of this character which will be simple and inexpensive in manufacture and installation, highly efficient in use, durable in service, and a general improvement in the art.

With the above and other objects and advantages in view, the invention consists in the details of construction to be hereinafter more fully described and claimed, and illustrated in the accompanying drawings, in which—

Figure 2:
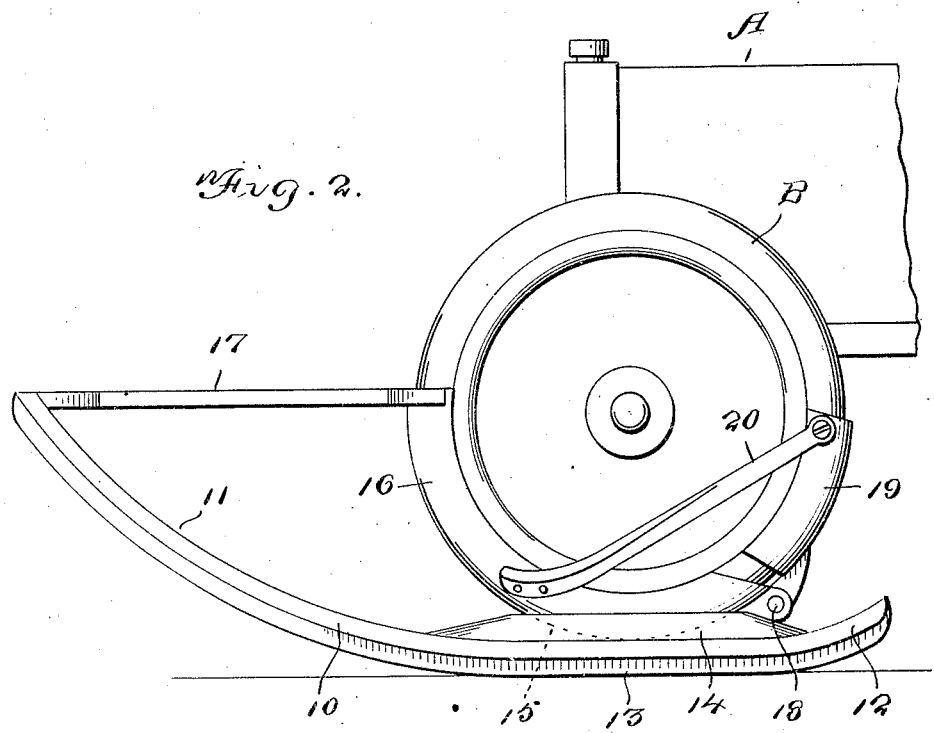
Figure 5:
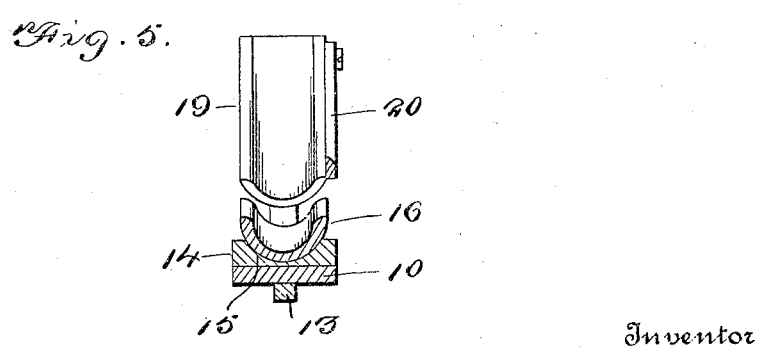

Figure 1 is a side elevation of my device in position upon the ground ready to have the front wheels of the automobile engaged therein, Fig. 2 is a similar view showing the device locked upon the wheels, Fig. 3 is a plan view of the device in unlocked position, Fig. 4 is a bottom plan view of one of the runner members, Fig. 5 is a cross sectional view therethrough, and The remaining figures are detail views.

Referring more particularly to the drawings, the letter A designates the front portion of an automobile and B designates the wheels thereof.

In carrying out my invention I provide a pair of runner members adapted for association with the front wheels of an automobile and each runner member comprises an elongated body 10 which is provided at its forward end with a long upward curve 11 and at its rear end with a relative short upward curve 12. Formed or secured upon the underside of each runner member 10 is a longitudinally extending rib 13 which extends the full length of the runner and which serves as a guide for the proper steering of the automobile equipped with my device, as it will be apparent that even when snow is partly packed by the broad surface of the runner 10, a rib 13 will penetrate the packed snow and effectively bite the same so as to prevent side slipping.

Secured upon the top of each runner 10 intermediate the ends thereof, is a supporting block 14 which is provided in its upper surface with a concavity 15. Seated within the concavity 15 is a saddle member 16 of a size and shape to extend partly around the front wheel B in embracing relation to the tire thereon. This saddle member is preferably riveted to the supporting block 14 though it may be secured in position by any other desired means, if preferred. Secured to the upper forward edge of the saddle member 16 is a brace 17 which has its other end secured to the upper forward end of the runner 10. Hinged upon the rear edge of the saddle member 16, as shown at 18, is a locking section 19 which, when swung into locking position, will also partially embrace the wheel B sufficiently to prevent the wheel from becoming displaced with respect to the saddle member. A locking member 20 is riveted or otherwise secured at one end to some convenient location on the saddle member 16 and has its other end detachably connected with the movable section 19 whereby this section 19 may be securely locked with respect to the body of the saddle. It is understood of course that the runner members are used in pairs and it is preferable that they be connected by some transverse rod to insure their movement in unison under the influence of the steering gear of the automobile.

In the use of the device, the parts are arranged as shown in Fig. 1, that is the locking member 20 is disconnected and the movable section 19 dropped downwardly so that its free end will rest upon the runner 10. The operator then drives the automobile onto the runners, up the sections 19, so that the front wheels will be disposed within the saddle members 16. The movable sections 19 are then swung into closed position, that is in engagement with the tire and the locking members 20 are locked whereupon the device will be firmly associated with the wheels. In removing the device it is of course obvious that the reverse operation is followed.

From the foregoing description and a study of the drawings it will be apparent that I have thus provided an extremely simple and inexpensive runner attachment for the front wheels of an automobile whereby the automobile may be used more effectively even in deep snow, the construction being such that the automobile thus equipped will run more easily and may be steered with accuracy, owing to the provision of the ribs on the under side of the runners 10. Owing to the fact that my device does not require the removal of the front tires it will be obvious that the automobile thus equipped will not lose any of its easy riding qualities and that it will be thoroughly comfortable as well as efficient in use.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A runner attachment for automobiles comprising a runner, a saddle member mounted upon the runner and arcuate in cross section and curved longitudinally for conforming engagement upon the tire of an automobile wheel, a relatively movable section similar to the saddle member pivotally connected with the rear end thereof and provided with a hole, a rearwardly and upwardly inclined bar rigidly secured to the saddle member and having its free end provided with a hole adapted to register with said first named hole when said movable section is swung into engagement with the tire, and a securing member passing through said registering holes.

In testimony whereof I affix my signature.

MELVIN G. MORSE.